United States Patent [19]

McClintock et al.

[11] 3,944,394

[45] Mar. 16, 1976

[54] APPARATUS SUITABLE FOR CARRYING OUT CATALYTIC PROCESS

[75] Inventors: William A. McClintock; Oliver P. Proctor, both of Bartlesville, Okla.

[73] Assignee: Phillips Petroleum Company, Bartlesville, Okla.

[22] Filed: Oct. 31, 1974

[21] Appl. No.: 519,692

[52] U.S. Cl.............. 23/288 K; 23/288 R; 23/289; 260/680 R; 208/146
[51] Int. Cl.²........................................... B01J 8/02
[58] Field of Search............. 23/288 K, 288 R, 289; 260/680 R; 208/146

[56] References Cited
UNITED STATES PATENTS

| | | | |
|---|---|---|---|
| 2,517,525 | 8/1950 | Cummings | 23/288 K |
| 3,498,755 | 3/1970 | Borre | 23/288 R |
| 3,627,497 | 12/1971 | Klein et al. | 23/288 R UX |

*Primary Examiner*—James H. Tayman, Jr.

[57] ABSTRACT

Feedstock at a first temperature is mixed with a heating fluid at a second temperature and the mixture resulting therefrom is immediately contacted with a catalyst in a catalytic conversion zone as the mixture reaches a third temperature, thus producing an effluent which is cooled to a fourth temperature as it is removed from the catalytic zone. Apparatus is provided useful for carrying out the above process.

11 Claims, 2 Drawing Figures

APPARATUS SUITABLE FOR CARRYING OUT CATALYTIC PROCESS

BACKGROUND OF THE INVENTION

The invention relates to apparatus suitable for carrying out a catalytic process. In another aspect the invention relates to an apparatus suitable for carrying out the catalytic dehydrogenation of hydrocarbons.

Many processes involve endothermic catalytic reactions whereby additional heat is added to a reaction zone in order to produce a desired product. In many cases, this additional heat can be added to the feed prior to contacting the catalyst; however, in some cases unwanted products are produced by side reactions caused by heating the feed to too high a temperature prior to contacting the catalyst. In addition, other problems can be encountered in catalytic reactions. For example, side reactions sometimes occur as a result of the feed contacting the catalyst for too long a period. Also where the effluent produced by the process is highly reactive at the temperatures experienced in the catalyst bed, side reactions again limit the desired product obtained per unit of feed.

It is an object of the invention to minimize side reactions in catalytic processes.

Another object of the invention is to provide an apparatus suitable for use in catalytic conversion processes.

Other objects, aspects, and advantages will be apparent to one skilled in the art upon consideration of the specification, drawings, and appended claims.

SUMMARY OF THE INVENTION

In accordance with the invention, apparatus is provided comprising a first chamber; a first conduit means for introducing a feedstock into the first chamber; a second conduit means for introducing a heating fluid into the first chamber to form a mixture of the feedstock and the heating fluid; a second chamber positioned adjacent to and circumferentially surrounding the first chamber and in open communication therewith for receiving the mixture and having means to discharge an effluent therefrom; and a cooling means positioned adjacent to and in open communication with the second chamber for cooling the effluent.

DESCRIPTION OF THE DRAWINGS

The apparatus and process of the invention will be more easily understood when explained in conjunction with the attached drawings in which.

DETAILED DESCRIPTION OF THE INVENTION

Figure 1:
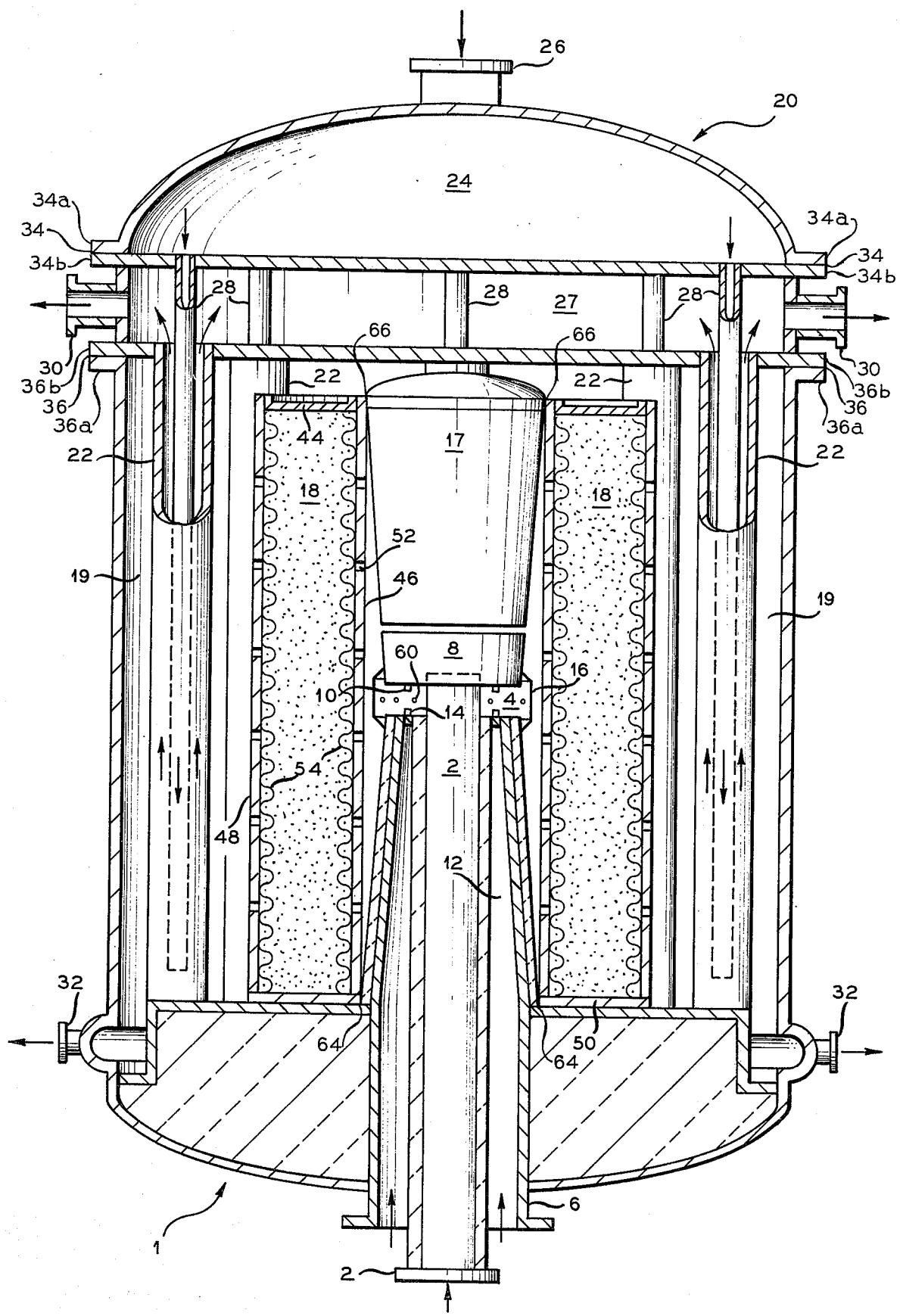
FIG. 1 is an elevational view partially in section of one embodiment of the apparatus of this invention.
Figure 2:
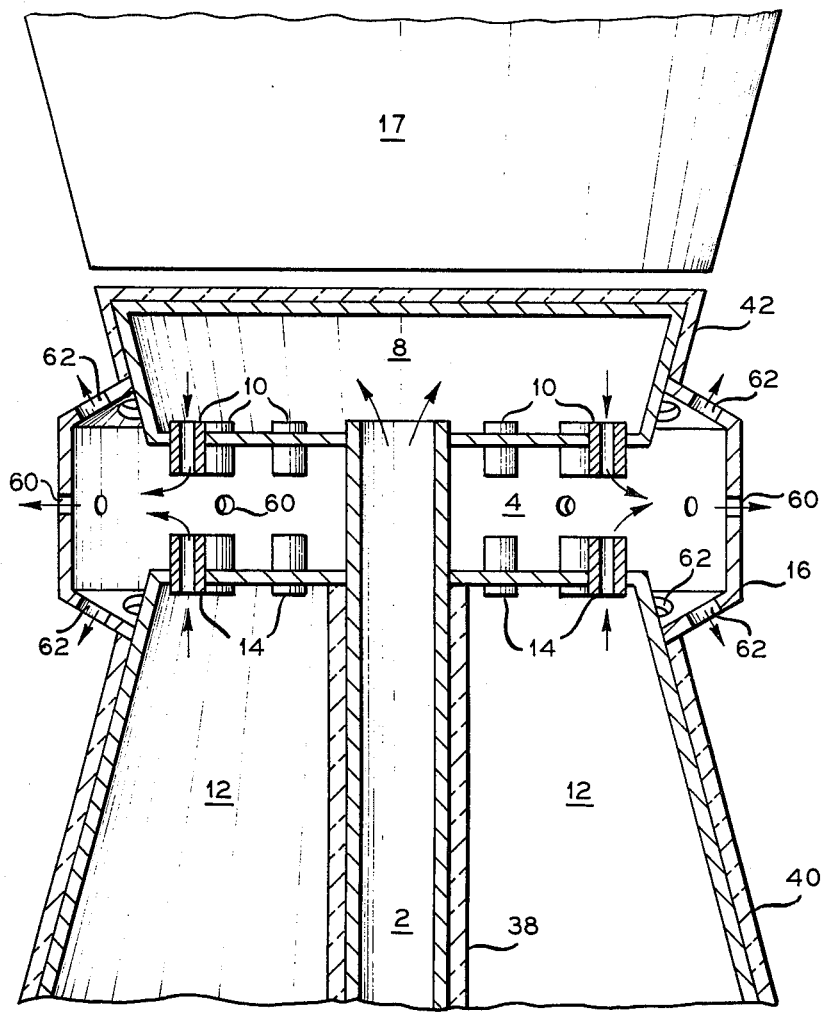
FIG. 2 is an enlarged view of a portion of the apparatus shown by FIG. 1.

Referring to FIG. 1, there is shown an apparatus, generally designated by reference numeral 1, which has a flanged inlet conduit 2 through which a feed enters mixing chamber 4. Flanged inlet conduit 6, coaxially aligned with and surrounding inlet conduit 2, provides means for a heating fluid to enter mixing chamber 4. On the outlet end of inlet conduit 2, as shown more clearly in FIG. 2, there is a frustoconical section 8 with apertures 10 through which the feed enters the mixing chamber 4. The end portion of inlet conduit 6 is constructed as a frustoconical section having apertures 14 at the outlet end thereof through which the heating fluid enters the mixing chamber 4. Apertures 10 and 14 are spaced apart and coaxially aligned. FIG. 2 also shows one embodiment a suitable diffuser 16 surrounding chamber 4 which has two sizes of holes 60 and 62 to evenly distribute the mixture. A cylindrical catalyst bed 18, which can be removed from the apparatus 1 after removing member 36b of flange 36, circumferentially surrounds the mixing chamber 4 and diffuser 16. It is pointed out that catalyst bed 18 can be other than cylindrical in shape provided the catalyst bed circumferentially surrounds mixing chamber 4. Further, the term "circumferentially surrounds" as used in the specification and claims is not intended to limit the structure of the particular components of the apparatus of the invention to circular structures. One end of catalyst bed 18 engages the heating fluid inlet conduit 6 at 64 and the other end engages one end of a frustoconical plug 17 at 66 so as to force all fluids entering mixing chamber 4 through catalyst bed 18. The outer surface and shape of plug 17 and the frustoconical section 8 of conduit 2 approximate the outer surface and shape of frustoconical section 12 of conduit 6 so as to encourage even flow of fluids through catalyst bed 18 and into outlet chamber 19.

Actually, a more even distribution of fluids flowing through the catalyst bed 18 is obtained employing outer surfaces of plug 17, section 8 of conduit 2 and section 12 of conduit 6 which are frustrums of a paraboloid of revolution rather than frustrums of a cone. Normally frustoconical structures are used for ease of fabrication, and such structures are shown in the attached drawings; however, it is understood that the present invention is not limited to the use of such frustoconical structures.

Heat exchanger outlet tubes 22 positioned in outlet chamber 19 of heat exchanger 20 positioned in the upper portion of apparatus 1 essentially surround the circumference of the outer surface of catalyst bed 18. The heat exchanger 20 is composed of several sections, including heat exchanger inlet plenum 24 with flanged inlet 26 and inlet tubes 28, and heat exchanger outlet plenum 27 with outlet tubes 22 and flanged outlets 30. The heat exchanger outlet plenum 27 is flanged to but isolated from inlet plenum 24 and outlet chamber 19 by flanges 34 and 36, respectively. In addition, flanged outlets 32 are provided in the lower end of chamber 19 near inlets 2 and 6 for removal of effluent.

In the operation of the invention, again referring to the apparatus of FIG. 1, a feedstock is passed through inlet conduit 2, frustoconical section 8, apertures 10, and into mixing chamber 4. The temperature of the feedstock should be high enough to minimize the amount of heating required to heat the feedstock to the reaction temperature in the mixing chamber but low enough to limit side reactions of the feedstock. A suitable heating fluid is passed through inlet conduit 6, frustoconical section 12, apertures 14, and into mixing chamber 4. In mixing chamber 4 heating fluid instantaneously and vigorously mixes with the feedstock and heats the feedstock to the desired reaction temperature. The temperature and flow rate of the heating fluid in inlet 6 can be varied to produce the desired reaction temperature of the mixture. As the mixture reaches the reaction temperature, it immediately contacts the catalyst bed 18 after passing through diffuser 16 which evenly distributes the mixture along the inner surface of catalyst bed 18. The effluent produced as the mixture passes through the catalyst bed 18 immediately contacts outlet tubes 22 of heat exchanger 20 in order to lower the temperature of the effluent before side reactions substantially reduce the amount of the desired product in the effluent. The cooled effluent then passes out flanged outlets 32.

It is generally desirable to insulate various portions of the apparatus 1 to prevent heat transfer between adjacent sections. For example, as shown in FIG. 2, insulation 38 is provided on inlet conduit 2 to prevent heating the feedstock with heating fluid passing through inlet conduit 6. Inlet conduit 6 is insulated, indicated by reference numeral 40, to prevent additional heating of the mixture passing through the catalyst bed 18. Similarly, the outer surface of frustoconical section 8 is insulated, indicated by the reference numeral 42, to prevent cooling the mixture passing through catalyst bed 18.

The apparatus as described above is particularly suitable for such catalytic processes as dehydrogenation of alkanes, alkenes, cycloalkenes, alkylpyridines, and alkylaromatics employing a wide variety of suitable catalysts. As an example, a preferred catalyst for the dehydrogenation of alkenes such as isoamylenes and butenes is one containing iron oxide, potassium oxide, and chromium oxide as known in the art. A number of heating fluids can be used, depending, of course, on the particular process involved. Where alkenes are dehydrogenated, superheated steam can be used as the heating fluid. Frequently superheated steam is mixed with the feedstock to raise it to a suitable temperature prior to passing the feedstock to inlet conduit 2.

It is important that apertures 10 and 14 be sized to provide approximately equal momentum of the feedstock and heating fluid entering the mixing chamber 4 to provide proper mixing.

The catalytic conversion processes herein described are endothermic within the catalyst bed, and the apparatus of the invention lends itself to rapid heating of the feedstock, minimal catalyst contact time, and rapid cooling of the effluent resulting in a very effective apparatus for carrying out dehydrogenation processes.

That which is claimed is:

1. A reactor comprising:
   first enclosing wall means forming a mixing chamber;
   first conduit means for directly introducing a feedstock into said mixing chamber;
   second conduit means for directly introducing a heating fluid into said mixing chamber wherein said heating fluid instantaneously and vigorously mixes with said feedstock to form a mixture of said feedstock and said heating fluid;
   second enclosing wall means surrounding said first enclosing wall means, said second enclosing wall means forming a second chamber adapted to contain catalyst, said second chamber positioned adjacent to and circumferentially surrounding said mixing chamber and in open communication therewith for immediately receiving said mixture and having means to discharge an effluent therefrom;
   third enclosing wall means surrounding said second enclosing wall means and forming reactor walls; and
   cooling means positioned adjacent to said second chamber and positioned inside said third enclosing wall means and in open communication with said second chamber for cooling said effluent.

2. The apparatus of claim 1 wherein said first conduit has a plurality of orifices therein through which said feedstock is introduced into said first chamber, and said second conduit has a plurality of orifices therein through which said heating fluid is introduced into said first chamber, said orifices in said first conduit are spaced apart from and coaxially aligned with said orifices in said second conduit.

3. The apparatus of claim 2 wherein said orifices in said first conduit are sized so as to provide a momentum of the feedstock through the orifices in said first conduit approximately equal to the momentum of the heating fluid through the orifices in said second conduit, and said cooling means is positioned adjacent to and circumferentially surrounding said second chamber.

4. The apparatus of claim 1 wherein said cooling means comprises:
   a. an inlet;
   b. an inlet plenum;
   c. a plurality of tubes, said tubes being in communication with said inlet plenum which is in communication with said inlet, said tubes being positioned in spaced apart relationship to each other, generally being positioned peripherally to said second chamber, and being positioned in close proximity thereto;
   d. an outlet plenum; and
   e. an outlet, said outlet being in communication with said outlet plenum which is in communication with said tubes.

5. The apparatus of claim 1 wherein said first conduit is positioned inside of and coaxially aligned with said second conduit.

6. The apparatus of claim 5 wherein said first conduit and said second conduit are insulated at least near said mixing chamber.

7. The apparatus of claim 1 further comprising a diffuser disposed between said mixing chamber and said second chamber so as to more uniformly distribute said mixture in said second chamber.

8. The apparatus of claim 1 wherein said second chamber contains a catalyst.

9. The apparatus of claim 8 wherein said catalyst is a dehydrogenation catalyst.

10. The apparatus of claim 1 wherein
    said first enclosing wall means forming the mixing chamber is defined by a circular diffuser plate forming an outer wall and having apertures therein, first and second annular end portions and a pipe forming an inner wall, said first and second annular end portions having the orifices therein, and said orifices in one end portion being spaced apart from and coaxially aligned with the orifices in the other end portion;
    said first conduit comprising said pipe and a frustoconical chamber in open communication with said pipe, said frustoconical chamber defined by a circular end portion, an outer wall, and said first annular end portion of said mixing chamber;
    said second conduit comprising the annulus formed by said pipe of said first conduit surrounded by a second pipe which tapers to form a frustoconical section with the end thereof being the second annular end portion of said mixing chamber;
    a frustoconical plug comprising a large circular end portion, a small circular end portion and an outer wall, said small circular end portion positioned adjacent the circular end portion of the frustoconical chamber of the first conduit such that the outer wall of the plug coincides with an extension of the outer wall of the frustoconical chamber of the first conduit;

said second enclosing wall means is defined by inner and outer walls having apertures therein and first and second annular end portions, said second chamber positioned adjacent and around said mixing chamber, the first annular end portion being attached to the circumference of the large circular end portion of the frustoconical plug, and the second annular end portion being attached to the circumference of the second pipe of said second conduit at the larger end of the frustoconical section of the second pipe;

said cooling means for cooling the effluent discharged from the second chamber comprising an inlet plenum, an outlet plenum, a plurality of tubes and a plurality of pipes, said pipes positioned adjacent and surrounding the outer wall of the second chamber thus generally defining a cylinder, one end of said pipes attached to the outlet plenum and in open communication therewith and the other end closed with circular end portions, one end of the tubes attached to the inlet plenum and in open communication therewith, said tubes extending through the outlet plenum which is located adjacent the inlet plenum, and extending into said pipes to a point near the closed end thereof; and said third enclosing wall means having first and second end portions and an intermediate portion positioned between said end portions, said third enclosing wall means generally positioned adjacent to and surrounding the cooling means, said first end portion having the first and second conduits passing therethrough, said second end portion having an inlet in communication with the inlet plenum, said intermediate portion adjacent the second end portion having a plurality of outlets in communication with the outlet plenum, and said intermediate portion near said first end portion having a plurality of outlets for removal of the effluent from the cooling means.

11. A reactor comprising:

first enclosing wall means forming a first mixing chamber, said first enclosing wall means defined by a circular diffuser plate forming an outer wall and having apertures therein, first and second annular end portions and pipe forming an inner wall, said first and second annular end portions having orifices therein, and said orifices in one end portion being spaced apart from and coaxially aligned with the orifices in the other end portion;

first conduit means for directly introducing a feedstock into said mixing chamber, said first conduit comprising said pipe and a frustoconical chamber in open communication with said pipe, said frustoconical chamber defined by a circular end portion, an outer wall, and said annular end portion of said mixing chamber;

a second conduit for directly introducing a heating fluid into said mixing chamber to form a mixture of said feedstock and said heating fluid, said second conduit comprising the annulus formed by said pipe of said first conduit surrounded by a second pipe which tapers to form a frustoconical section with the smaller end thereof being the second annular end portion of said mixing chamber;

a frustoconical plug comprising a larger circular end portion, a small circular end portion and an outer wall, said small circular end portion positioned adjacent the circular end portion of the frustoconical chamber of the first conduit such that the outer wall of the plug coincides with an extension of the outer wall of the frustoconical chamber of the first conduit;

second enclosing wall means surrounding said first enclosing wall means, said second enclosing wall means forming a second chamber adapted to contain catalyst, said second enclosing wall means defined by inner and outer walls having apertures therein and first and second annular end portions, said second chamber positioned adjacent and around said mixing chamber, the first annular end portion being attached to the circumference of the large circular end portion of the frustoconical plug, and the second annular end portion being attached to the circumference of the second pipe of said second conduit at the larger end of the frustoconical section of the second pipe;

a cooling means for cooling the effluent discharged from the second chamber comprising an inlet plenum, an outlet plenum, a plurality of tubes and a plurality of pipes, said pipes positioned adjacent and surrounding the outer wall of the second chamber thus generally defining a cylinder, one end of said pipes attached to the outlet plenum and in open communication therewith and the other end closed with circular end portions, one end of the tubes attached to the inlet plenum and in open communication therewith, said tubes extending through the outlet plenum which is located adjacent the inlet plenum, and extending into said pipes to a point near the closed end thereof; and third enclosing wall means having first and second end portions and an intermediate portion positioned between said end portions, said third enclosing wall means generally positioned adjacent to and surrounding the cooling means, said first end portion having the first and second conduits passing therethrough, said second end portion having an inlet in communication with the inlet plenum, said intermediate portion adjacent the second end portion having a plurality of outlets in communication with the outlet plenum, and said intermediate portion near said first end portion having a plurality of outlets for removal of the effluent from the cooling means.

* * * * *